No. 874,008. PATENTED DEC. 17, 1907.
B. HOLT.
TRACTION ENGINE.
APPLICATION FILED FEB. 9, 1907.
7 SHEETS—SHEET 3.
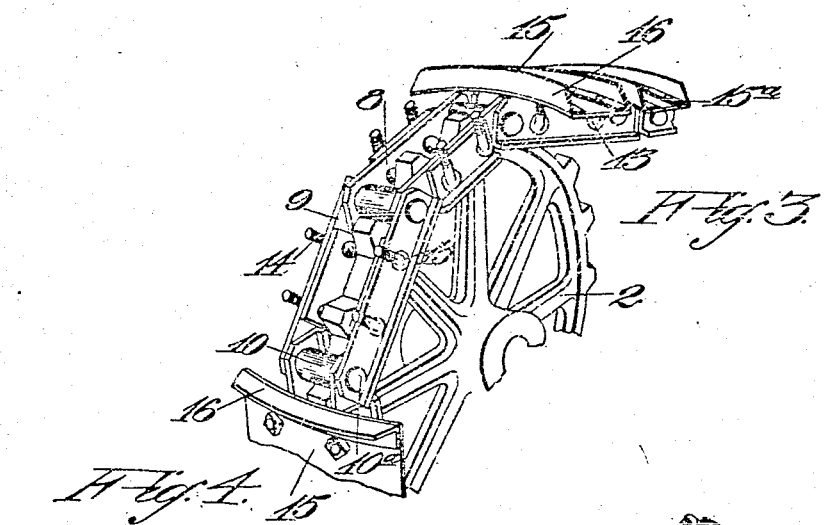
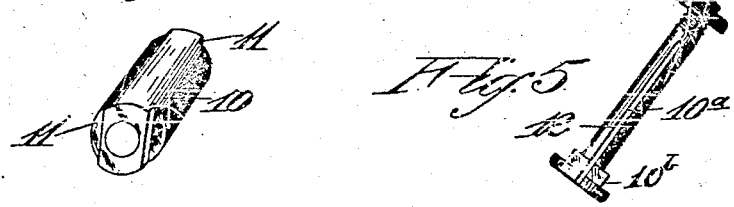
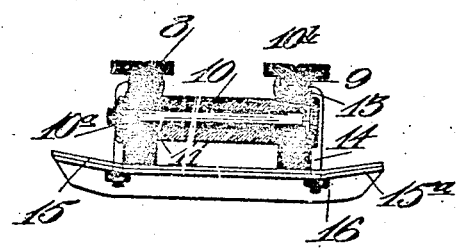
WITNESSES:
INVENTOR
Benjamin Holt.
BY Geo. H. Strong
ATTORNEY No. 874,008. PATENTED DEC. 17, 1907.
B. HOLT.
TRACTION ENGINE.
APPLICATION FILED FEB. 9, 1907.
7 SHEETS—SHEET 4
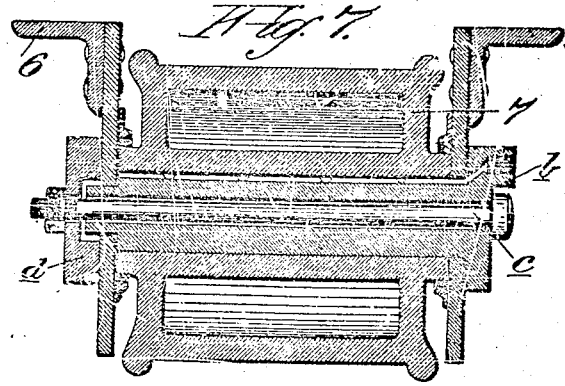
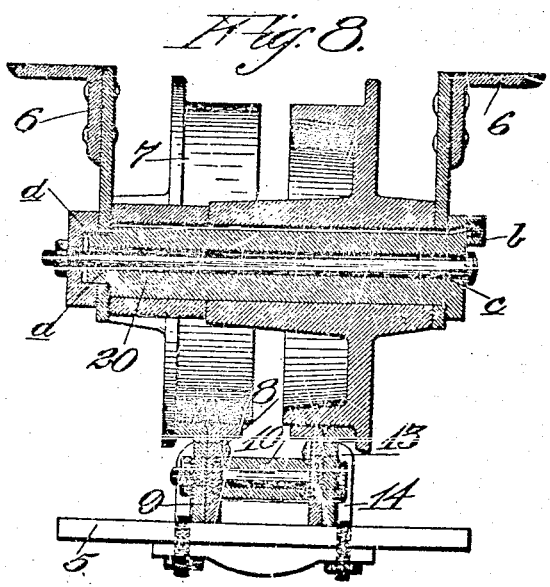
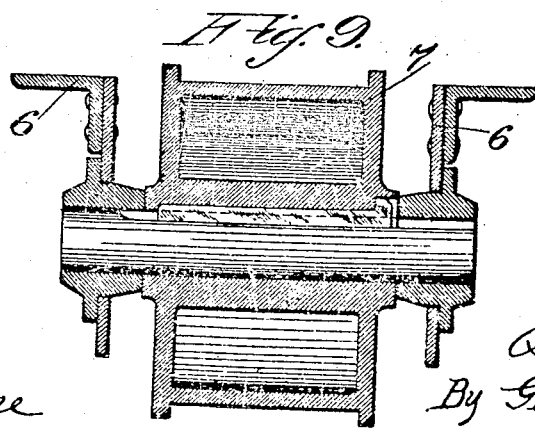
WITNESSES:
INVENTOR
Benjamin Holt.
By Geo. H. Strong
ATTORNEY

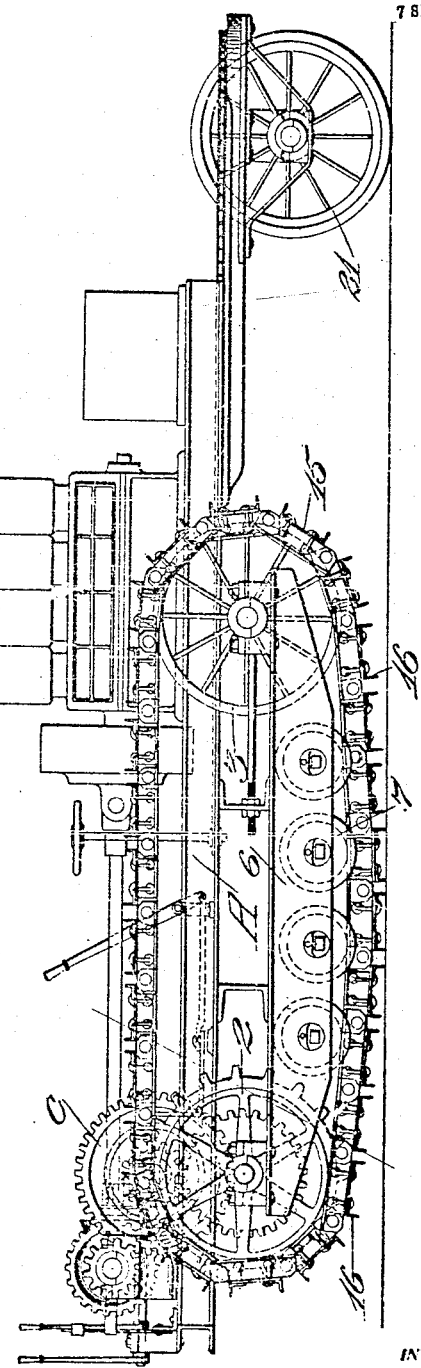

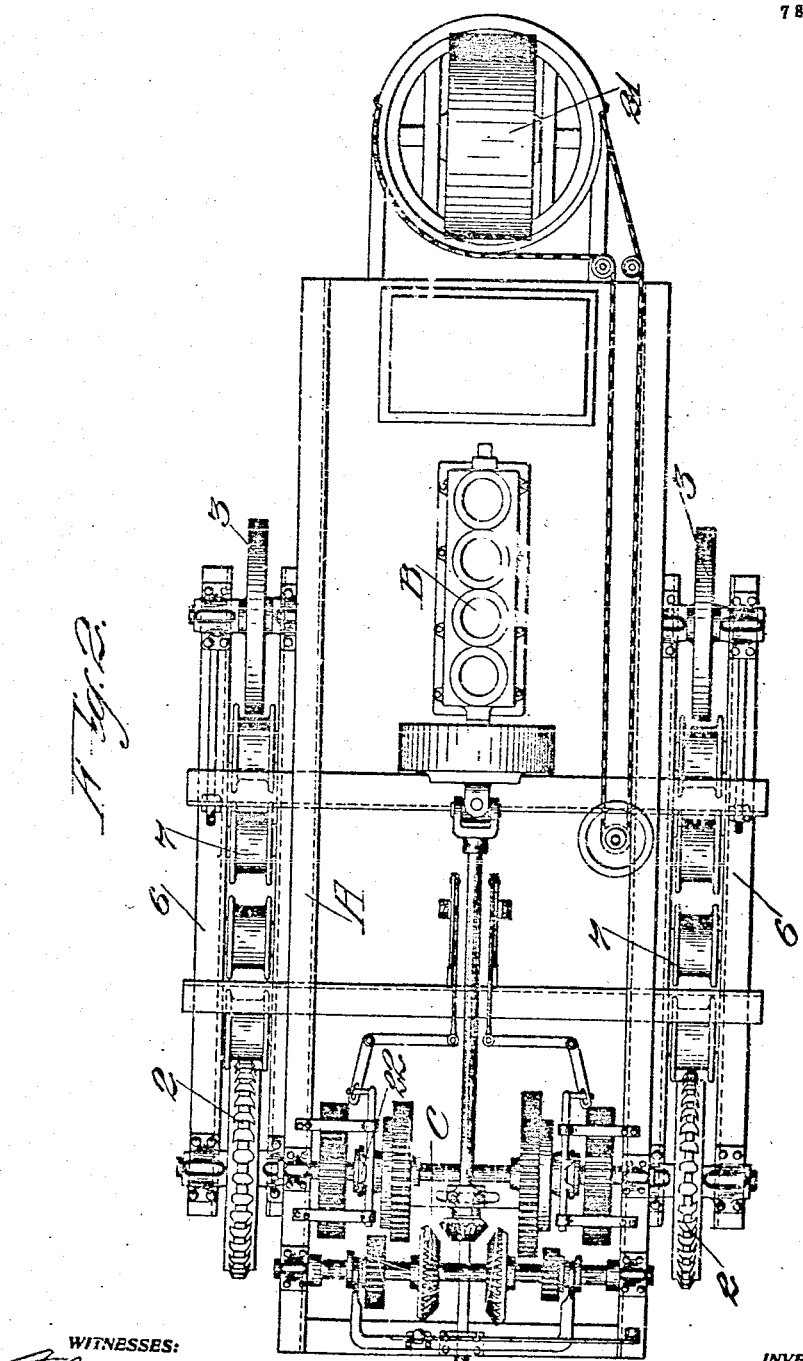

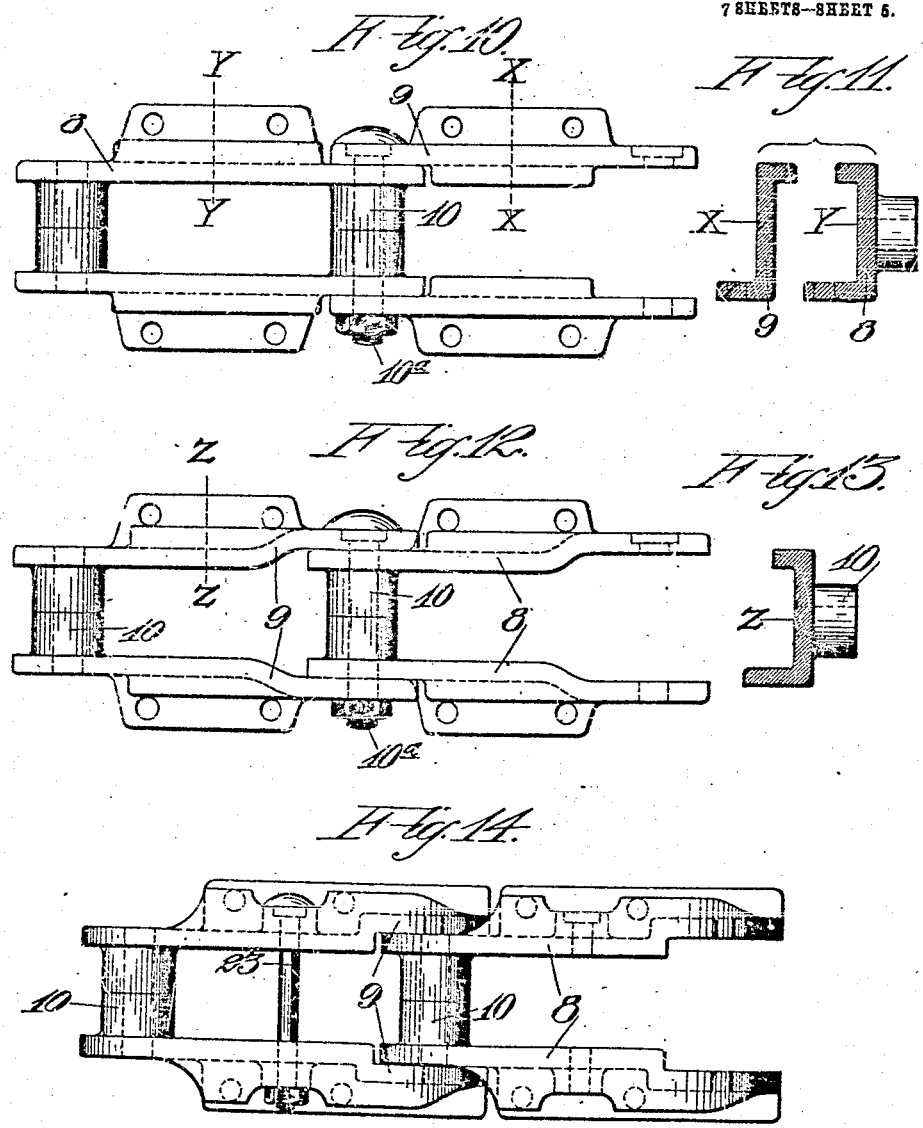

No. 874,908. PATENTED DEC. 17, 1907.
B. HOLT.
TRACTION ENGINE.
APPLICATION FILED FEB. 9, 1907.

7 SHEETS—SHEET 6.

WITNESSES:

INVENTOR
Benjamin Holt
BY Geo. H. Strong.
ATTORNEY

No. 874,008. PATENTED DEC. 17, 1907.
B. HOLT.
TRACTION ENGINE.
APPLICATION FILED FEB. 9, 1907.

7 SHEETS—SHEET 7.

WITNESSES:

INVENTOR
Benjamin Holt
BY Geo. H. Strong.
ATTORNEY

UNITED STATES PATENT OFFICE.

BENJAMIN HOLT, OF STOCKTON, CALIFORNIA.

TRACTION-ENGINE.

No. 874,008.

Specification of Letters Patent.

Patented Dec. 17, 1907.

Application filed February 9, 1907. Serial No. 356,546.

*To all whom it may concern:*

Be it known that I, BENJAMIN HOLT, citizen of the United States, residing at Stockton, in the county of San Joaquin and State of California, have invented new and useful Improvements in Traction-Engines, of which the following is a specification.

My invention relates to an improvement in vehicles, and especially of the traction engine class; and includes endless traveling platform supports upon which the engine is carried.

It consists in a combination of parts, and in details of construction which will be more fully explained by reference to the accompanying drawings, in which—

Figure 15:
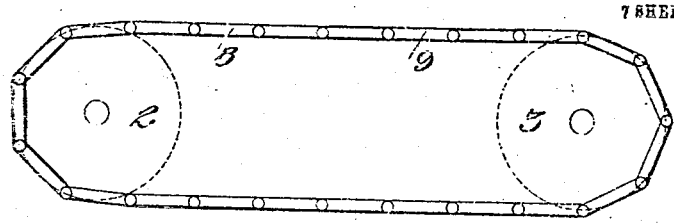
Figure 16:
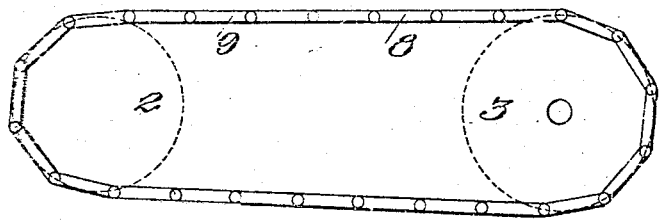
Figure 17:
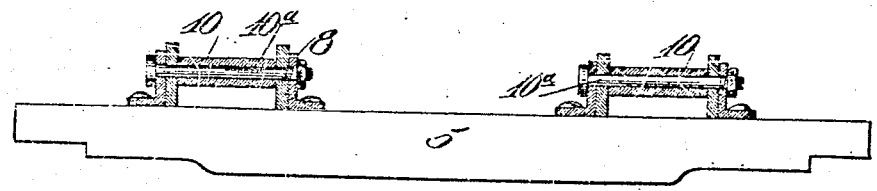
Figure 18:
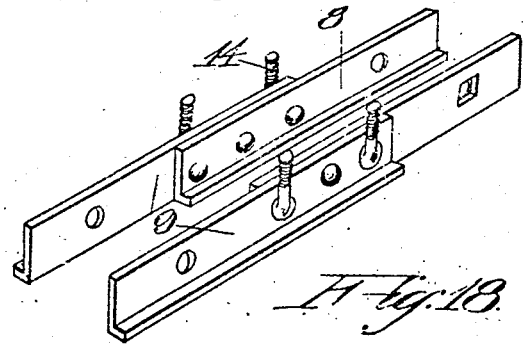
Figure 19:
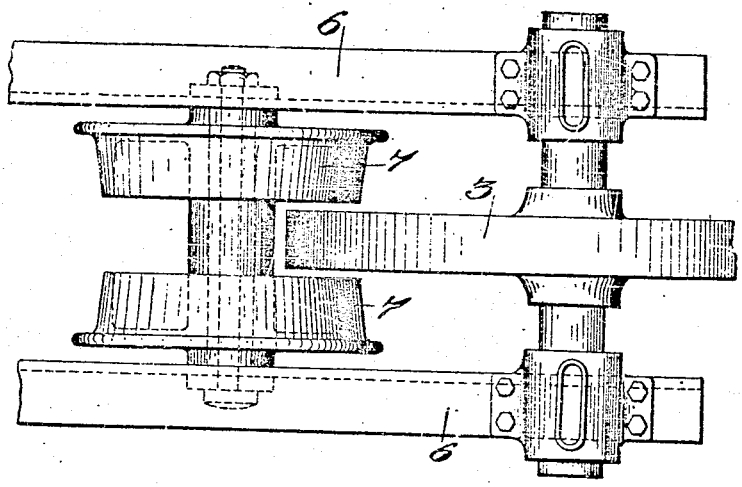

Figure 1 is a side elevation of my apparatus. Fig. 2 is a plan. Fig. 3 is a perspective view of parts of the sprocket wheel and chain. Fig. 4 is a view of a sleeve 10. Fig. 5 is a view of a connecting bolt. Fig. 6 is a transverse section of link connections. Figs. 7, 8 and 9 are transverse sections of bearing-wheels or rollers and supports. Figs. 10, 11, 12, 13, 14 are enlarged views of chain links and connections. Figs. 15 and 16 are diagrammatic views showing contact position of chains with the wheel peripheries. Fig. 17 is a transverse section showing two bearers upon one shoe. Fig. 18 is a perspective view of side plates and rivet pins. Fig. 19 shows the wheels overlapping the chain-bearing wheels.

It is the object of my invention to provide such improvements in that class of vehicles known as "traction engines" as will enable the engine to transmit its power so as to most efficiently propel it over the surface upon which it travels; and in the construction of endless traveling belts upon which the weight of the machine is supported, and through which power is transmitted to propel it.

I have herein shown my invention as especially applied to a traction engine, the frame A of which is here shown as made of transversely disposed channel, angle, or like bars. Upon this frame is mounted a suitable motor B from which power is transmitted through intermediate gearing C to revolve the sprocket-wheels 2. At the opposite end of the frame and upon each side thereof are similar wheels 3. Between these sprocket-wheels extend the endless traveling belts which I have termed "platforms," and which serve to support the weight of the machine upon any surface over which it may be called to travel. These platforms are composed of links overlapping and pivoted together, and having such a length with relation to the distance between the sprocket-wheels and the number of teeth upon the wheels that their connecting bolts may engage the teeth of the sprocket-wheels in such a manner as to be propelled and carried thereby.

In certain classes of machines where unusual weight is to be carried there may be two lines of sprocket-wheels for each platform, and two lines of links forming endless chains to pass around these sprockets, Fig. 17. Transverse shoes 5 are secured to these chain links, and provide a sufficiently broad support to prevent the apparatus carried thereon from sinking into the ground or becoming stalled. Where the machines are of smaller and lighter construction, a single line of sprockets with a single line of chain may be employed; the links being constructed in a similar manner in each case.

Bearings upon each side of the machine are provided by longitudinal plates 6 extending between the transverse beams of the frame, carrying upon their ends the journal-boxes of the sprocket-wheels 2 and 3, and carrying near their lower edges the supports for flanged wheels 7 which travel upon the inner edges or surface of the chain links where they pass between the peripheries of the sprocket-
wheels. Or the flanged wheels may revolve on pins or gudgeons secured to or passing through these plates. A convenient form of this arrangement is a gudgeon flattened on one end *a* and having on the other end a round head *b* with a hole on its upper edge to receive lubricant which thence runs along a groove upon the upper side of the gudgeon 20. This gudgeon passes through a round hole in one plate (6) and its flattened end projects through a correspondingly-shaped hole in the other plate. It is thus prevented from turning. A bolt *c* passes through the gudgeon, (the metal around the above mentioned oil hole also serving to prevent the bolt head from turning,) and through a washer *d* shaped to receive the flattened end of the gudgeon. This arrangement secures the gudgeon in the plates and at the same time prevents any undue pressure of the plates upon the ends of the hubs of the flanged wheels. These bearers 6 may be formed of angle and plain plates riveted together, or they may be built up in other ways; but the disposition of the bearing-wheels 7 is preferably such that a line drawn through the axles or the lower peripheries of these wheels, will be in the form of a curve presenting its convexity downward, so that by reason of this curve, the bearing of the machine will be such as to render the turning of the machine from one side to the other more easily effected, than if this lower bearing surface was straight.

It will be understood that the front portion of the machine will be supported upon one or more steering-wheels 21 of the character well known in the construction of this class of apparatus, and as there are two of these bearing platforms, one upon each side of the machine, a differential or clutch mechanism 22 of any suitable character may be connected with the gearing C, so that the power of the engine or motor may be transmitted to either of the driving sides of the apparatus, thus greatly assisting in turning the machine wherever desired. Such a differential mechanism may be employed in conjunction with a steam or hydrocarbon driven motor.

The links of the chain which carry the platform are what are termed male and female links; the male links being of the form shown at 8, and the female links at 9; said links being so formed that the ends of the male links are narrower than the contiguous ends of the female links and pass between the ends of the female links. Both sides of these links may be formed of two plates, an inner and an outer plate; the inner plates of the male link being sufficiently longer than the outer plates, to pass between the longer outside plates of the female links and the shorter inside plates of the female links are substantially in line with the longer plates of the male links and the corresponding longer plates of the female links are in line with the shorter outside plates of the male links thus forming a double structure for the links on each side of the chain and wide bearing for the wheels 7. The overlapping ends of these links may be united together by connections 10, these connections consisting of an outside sleeve 10 and bolt 10ª which is adapted to pass through the sleeve.

The sleeves fit between the inner sides of the female links at their point of connection and are flattened out at each end as shown at 11, the flattened portions extending through correspondingly shaped holes in the ends of the male links and are thus locked and prevented from turning with relation to the male link. The bolts 10ª pass through holes in the end of the female link and through the sleeve. Under the head of the bolt is a square shoulder 10ᵇ which fits in a correspondingly shaped hole in the end of the female link and prevents the bolt from turning with relation to the female link. These bolts turn in the sleeves. They are entirely protected from grit and dirt, and have passages or channels as shown at 12, through which a lubricant may be injected at proper times to make the bolts turn easily within the sleeves; thus the turning movement in passing around the sprockets is easily made and with very little friction.

The inner and outer plates forming the links are riveted together. I have here shown these rivets at 13 having a stem or bolt 14 extending at right angles with the outer portions of the rivets, and extending far enough outside the rivets to carry the transverse bearing plates 15 which form the platform of the chain, and which plates may be made of metal extending transversely to as great a distance on each side of the chain as the weight of the apparatus renders desirable.

In some cases and for heavy machinery, or for very soft ground, I may introduce supplemental shoes 15ª which are bolted through and secured to and by the plates 15; these plates 15ª having the ends extending a considerable distance outside the plates 15. These shoes or plates may be curved transversely as shown, and have upturned flanges 16 which serve to increase the traction in case the ground is slippery; the upturned edges of these plates entering the ground sufficiently to prevent slipping or skidding.

Instead of being fastened at the pivot with a bolt as described, I may use a round pin with squared ends, the round part being in the sleeve and the end of the male link and the squared ends occupying correspondingly shaped holes in the end of the female link. In that case a bolt 23 through the center of the link would hold the two sides from falling apart.

Instead of being made of two plates riveted together and having the ends connected with a separate sleeve, each side of the link may be cast or forged in one solid piece. Each side of the male may have half the sleeve cast solid with it, or the two sides of the male and the sleeves may all be cast in one solid piece. Instead of separate male and female links, a hermaphrodite link may be made of any of the before mentioned kinds, one end being male and the other end female as shown at Figs. 12—14. Such a link is necessary where an odd number of links is used.

The bearing-wheels 7 are made either as solid wheels or wheels having flanges upon only one side, Fig. 8. Where the wheels have only one flange, thus traveling with the flanges upon one side of the support, they may be journaled intermediate of those traveling upon the opposite side. This makes the wheels overlap and makes the distance between consecutive bearings on the chain shorter.

In order to make wide bearing-plates 15, the links of the chain are of unusual length as compared with their other dimensions. In order to prevent a lost motion when reversing, it is desirable to increase the number of sprocket-teeth with relation to the distance between the bolts by which the links are united. Thus, two or more of the teeth of the sprocket will pass between each of the bolts uniting links, and what may be called the regular teeth will engage the pivot bolts or pins of the chain on the forward motion, and the extra teeth will be in position to engage with the pivot bolts at the other end of the link, so that there will be no material slippage of the chain in case the movement is reversed. In designing one of these sprockets, the pitch circle with relation to the pitch of the chain is that of a sprocket the number of whose teeth is a mixed number of which the fractional part is one-half. In such a sprocket all the teeth are used both on the forward and on the reverse; but any particular tooth is only used once in every two revolutions of the sprocket, thus doubling the life of the sprockets by correspondingly reducing the wear.

When endless platform chains are made with the chain links so disposed with relation to the sprocket-wheels that the meeting ends of the links and the central portions alternately ride over the sprockets, at the same time, these chains will, in passing over the upper part of their travel, vibrate or flop with considerable violence; and the longer the links the greater the violence. In order to overcome this tendency, the distances are so proportioned that while the joint of one pair of links is passing over the top of the front sprocket, the intermediate portion of a link will be passing over the top of the other sprocket. In order to accomplish this, the distance between the centers of the sprocket-wheels must equal the distance between the centers of the pivots of a link multiplied by some mixed number, the fractional part of which is one-half. When I use the sprocket-wheels with a plurality of teeth as mentioned above, and the total number of teeth in one sprocket is an odd number, I make one sprocket larger than the other by the amount of two teeth. I am then able to place them the proper distance apart to prevent the flopping of the chain. In Fig. 19 the rollers 7 are separated to overlap and shorten their distance from the chain wheels and reduce chain vibration.

Having thus described my invention, what I claim and desire to secure by Letters Patent is—

1. In a traction engine, a main frame, parallel supplemental frames, with rollers mounted between and contiguous to the lower edges of said frames, sprocket-wheels journaled in line between the supplemental frames, a motor carried upon the main frame, and means for transmitting motion therefrom to the sprocket-wheels, chains passing around the sprocket-wheels, said chains formed of links having flanged inner edges upon which the bearing-rollers rest, independent platform shoes, and means uniting them to the chain links to form integral endless platforms driven by the sprockets.

2. A traction engine including a main frame, a motor mounted thereon, parallel supplemental side frames sprocket-wheels journaled in pairs upon each side between said frames, endless jointed platforms passing around the sprocket-wheels upon each side of the machine, a turnable steering mechanism by which the front of the frame is supported and guided, gearing through which motion is transmitted from the motor to revolve the sprocket-wheels, mechanism whereby one of the traveling platforms may be driven independently of the other, and in unison with the turning of the steering apparatus, and means substantially as described to lubricate the platform link joints.

3. In a traction engine, a main frame having a motor mounted thereon, supplemental side frames sprocket-wheels disposed in pairs upon each side of and between the frame, endless jointed platforms passing around said sprockets to support the main portion of the apparatus, a turnable steering mechanism by which the front portion is supported, gearing through which motion may be transmitted from the motor to drive the traveling platforms either separately or in unison, rollers journaled upon the lower part of the main frame with their peripheries traveling upon the inner surface of the chain links of the platform as the latter are advanced, and means to prevent lost motion in forward or reverse movements.

4. In a traction engine, a main frame, a motor carried thereon, a steering mechanism connected with the front part of the frame, sprocket-wheels disposed in pairs upon opposite sides of the frame, an endless platform passing around the sprockets upon each side, said platform being composed of links pivoted together, and shoes fixed transversely to each of the link members, said shoes having transverse projections upon their bearing surfaces, and combined rivet bolts to unite the link elements and the exterior platform shoes.

5. In a traction engine, a main frame with front steering apparatus, sprocket-wheels journaled upon the sides of the rear portion of the frame, a motor and gearing whereby the sprocket-wheels may be revolved, an endless traveling platform, said platform being composed of chain links with bearing shoes secured to the outer sides of the links, said links consisting of alternate male and female sections having transverse sleeves at their junction, pivot pins or bolts passing through the sleeves to form turnable joints between the links, and wheels or rollers mounted in the lower part of the main frame and adapted to travel upon the inner edges of the compound links.

6. In a traction engine, a main frame having sprocket wheels journaled upon each side at a distance from each other, an endless jointed traveling platform passing around each of the pairs of sprockets, and consisting of chain links overlapping and pivoted at their junctions, said links having transverse extensions forming a wide inner surface, wheels or rollers mounted on the lower part of the frame adapted to travel upon said inner surfaces of the links, platforms bolted to the outer surfaces of the links, a motor carried upon the main frame and mechanism intermediate between the motor and the sprocket-wheels whereby the latter are rotated.

7. In a traction engine, a main frame, sprocket-wheels journaled at a distance apart upon each side thereof, chains composed of male and female links having overlapping ends and connecting pivot pins, said links having flanges or extensions upon their inner edges, a bearing formed of wheels or rollers mounted in the lower part of the frame and adapted to travel upon the inner edges of the chain links, rivets by which the sections of each link are secured together, said rivets having threaded bolts extending outwardly, and shoes or treads carried by each of the links, fitting the ends of the rivet bolts and secured thereto.

8. In endless platforms for traction engines, chain links consisting of male and female overlapping members pivoted together, said links having plates alternately on their opposite sides, and in line respectively with the main link sections, means for securing said link plates together, said means consisting of rivets having bolts projecting outwardly substantially at right angles with the rivets, and treads or platform surfaces fixed transversely of each pair of link members, said platforms being secured to the projecting ends of the rivet bolts.

9. In an endless flexible platform support and propeller for traction engines, male and female link sections flexibly connected at the ends, with the alternate inner and outer portions overlapping to form broad track surfaces, disconnected platform sections secured to the outer surfaces of the links, and flanged rollers mounted upon the engine frame, supported and turnable upon the inner track surfaces of the links.

10. In an endless, flexible, traveling, platform support and propeller for traction engines, links flexibly jointed at their meeting ends, disconnected platform sections fixed to the outer edges of the links, broad track surfaces formed upon the inner link edges substantially in line, revoluble sprocket-wheels around which the platforms travel, an engine and supplemental frame upon which said sprockets are journaled, said frame having downwardly extending plates, and flanged rollers mounted contiguous to the lower edges of the plates and supported and revoluble upon the inner link edges.

11. In an endless, flexible, traveling platform support for traction engines, an engine frame, sprocket-wheels mounted upon each side of the frame, around and by which the platforms are propelled, supplemental frame sections extending downward between the sprockets, wheels turnable between the said sections, and links connecting the platform sections, and having their inner edges forming tracks upon which the wheels are revoluble.

12. In an endless, flexible, traveling platform support for traction engines, pivoted links carrying platform sections, an engine frame, with sprocket-wheels upon each side, around and by which sprockets the platforms are propelled, supplemental frame plates vertically on edge extending between the sprocket-wheels and having journal-boxes at their outer ends, in which the sprocket-wheel shafts are turnable, flanged wheels supported between the lower edges of said plates with their peripheries adapted to travel upon the inner edges of the platform carrying links.

13. In an endless, flexible traveling platform support for traction engines, a main engine frame, supplemental frames parallel with the outer sides of the main frames, and wheels mounted near the lower edges of the supplemental frames adapted to travel upon the inner edges of the chain links, sprocket-wheels located between the supplemental frames, and journal-boxes at the ends of the supplemental frames within which boxes the outer ends of the sprocket shafts are turnable.

14. In an endless flexible traveling platform support for traction engines, a main engine frame, supplemental side frames between which the platform-carrying sprocket-wheels are journaled, said side frames formed of angle or channel iron secured to the main frames, and downwardly extending plates fixed to the angle plates and carrying support-boxes for wheels which travel upon the platforms.

15. In an endless, flexible, traveling platform support and propeller for traction engines, sprocket-wheels journaled upon each side of the machine, chain links to which the platform sections are secured, said links having such length between their pivot centers that the pivot joints of two links will engage a tooth at the top of one sprocket, and the central part of a link will register with the top of the following sprocket.

16. An endless flexible traveling platform support for traction engines, in which the distance between sprocket centers equal to the whole number of links and a half a link in a corresponding length of platform on the pitch line of the sprockets.

17. In an endless flexible traveling platform support, sprockets over which the platform is extended, said sprockets having a distance between centers equal to the number of links in a corresponding length of platform sections, and one of the sprockets having two teeth less than the other.

18. In an endless flexible, traveling platform support, means to prevent vibration of the unsupported platform sections, said means consisting of jointed links of such length that only a whole number of links and one-half a link will coincide with the distance between sprocket centers.

19. In an endless, flexible platform-support, open links pivoted at their junctions, toothed sprockets over which the links travel, said sprockets having a plurality of teeth for each link space with which they engage.

20. In an endless flexible platform support, means to prevent lost motion in reversing, said means consisting of pivoted links with open spaces between their pivot centers, sprockets over which the links pass, said sprockets having a plurality of teeth registering with each link space, one of which teeth engages in advance movement and the other in reverse.

21. In an endless flexible platform support, open pivoted links united to form a chain, sprockets having an odd number of teeth so spaced that two teeth will enter each link space and each tooth is engaged to operate only once in two revolutions of the sprocket.

22. An endless flexible traveling platform support for traction engines in which the distance between the sprocket centers equals the distance between the pivots of one link multiplied by a mixed number the fractional part of which is one-half.

23. In an endless flexible traveling platform support, means to overcome the vibrations of the platform or chain between the sprockets over which it passes, said means including sprockets of different diameters having two teeth for each link space, and the total number of teeth in either sprocket, an odd number.

24. An endless traveling platform belt support for traction engines, said belt constructed of alternate male and female overlapping sections and connections including pins fixed with relation to the female sections, and sleeves within which the pins are turnable, said sleeves being fixed with relation to the male sections.

25. An endless traveling platform belt support for traction engines, said support consisting of overlapping male and female platform-carrying sections, sleeves extending and fixed between the ends of the male sections, pins turnable within the sleeves and male sections, and fixed in the female sections.

26. In an endless traveling platform support for traction engine, chains composed of successive male and female link sections with interposed distance maintaining bosses, and gudgeons and pivot uniting pins.

27. In an endless traveling platform support for traction engines, sprocket-wheels around and by which the platform chains are carried, flanged wheels mounted upon each side of the main frame and traveling on the edges of the chains, fixed gudgeons, bolts extending through the gudgeons, oil holes at the outer ends and longitudinal channels with which they connect within the gudgeons.

28. In an endless traveling platform support for traction engines, flanged bearing-wheels mounted on the main frame and traveling upon the edges of the platform chains, said wheels being staggered to travel in different planes and alternately upon the outer and inner edges of the chains.

29. In an endless traveling platform support for traction engines, a plurality of parallel endless chains to which each platform section is secured, flanged wheels mounted upon the engine frame to register with and travel upon the chains, and sprocket-wheels by which the chains are carried.

30. In an endless traveling platform support for traction engines platform-carrying chains composed of male links with sleeves or gudgeous extending inwardly, pins turnably fitting the gudgeons and male links, female links between the ends of the male links pivot and in which the pins are non-turnably fixed.

31. In an endless flexible platform support, open pivoted links united to form a chain, sprockets having teeth so spaced that a plurality of teeth will enter each link space and each tooth is engaged to operate only once in the number of revolutions of the sprocket which equals the number of teeth in each link space.

32. In an endless flexible traveling platform support, means to overcome the vibration of the platform or chain between the sprockets over which it passes, said means including sprockets of different diameters having a plurality of teeth for each link space, and the total number of teeth in either sprocket such a number and so spaced that each tooth is engaged to operate only once in the number of revolutions of the sprocket which equals the number of teeth in each link space.

33. In an apparatus of the character described, a main motor bearing frame, supplemental side frames, having rollers journaled in the lower part, sprocket-wheels journaled at opposite ends between the frames, endless chains with detachable platform shoes passing around the sprockets and beneath the rollers, and means for transmitting power from the motor to the sprockets.

34. In an apparatus of the character described, a main motor bearing frame, supplemental parallel side frames with flanged rollers between their lower edges, sprocket-wheels journaled at each end of the supplemental frames, endless chains composed of plates having overlapping links pivoted together with flanges projecting transversely from the inner edges to form bearing surfaces for the rollers, and independent transverse platform plates, with means for detachably fixing them to the chain links.

35. In an apparatus of the character described, chain links formed of parallel plates having the ends alternately separated and contracted to overlap, and connecting pivot pins for said ends, said plates having flanges extending outwardly between the overlapping portions, and forming substantially continuous tracks for bearing-wheels.

In testimony whereof I have hereunto set my hand in presence of two subscribing witnesses.

BENJAMIN HOLT.

Witnesses:
S. H. NOURSE,
FREDERICK E. MAYNARD.